May 31, 1932.  E. H. WOLF  1,861,104
LAWN EDGE TRIMMER
Filed Oct. 12, 1931    2 Sheets-Sheet 1
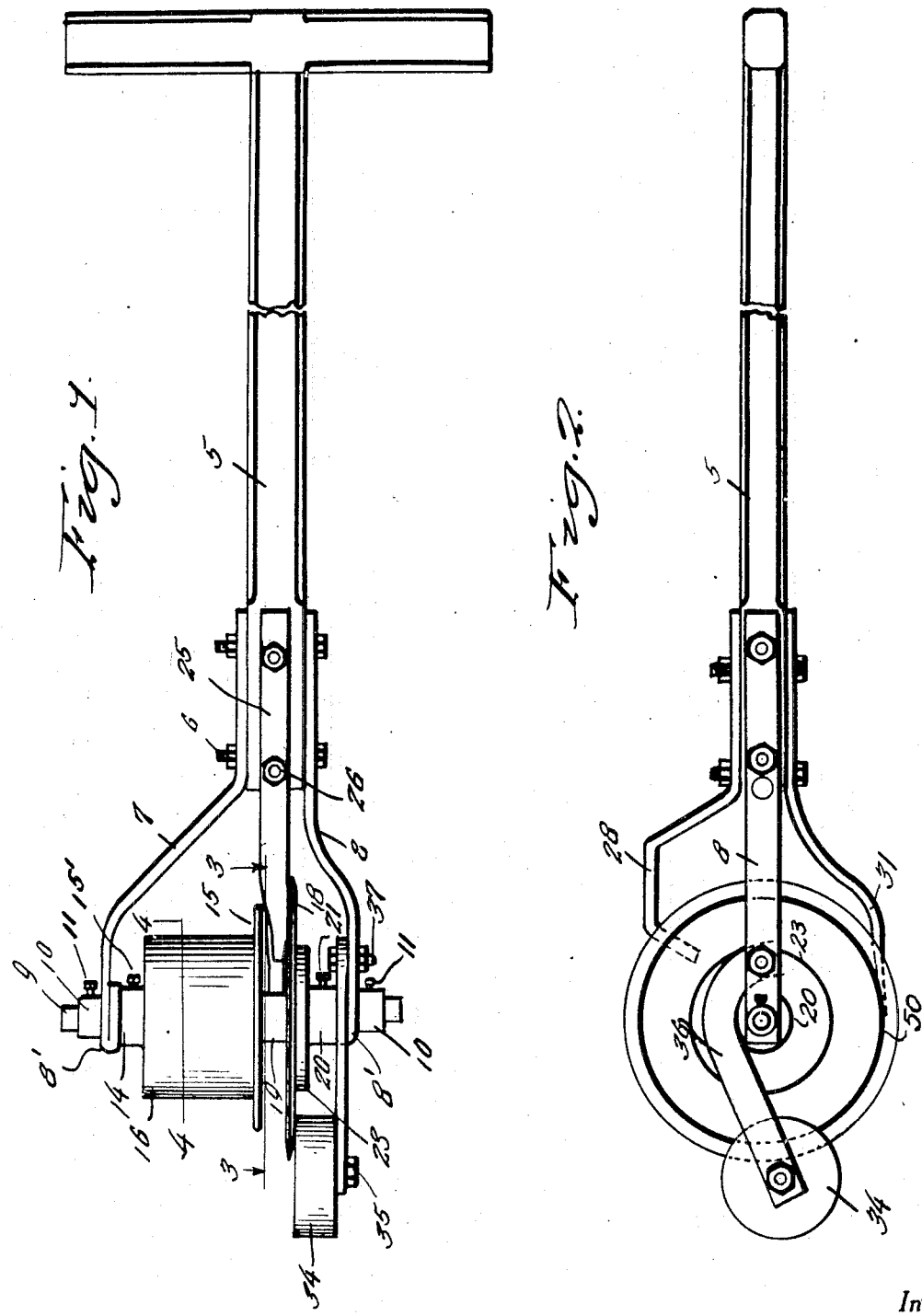
Inventor
Ernest H. Wolf
By Clarence A. O'Brien
Attorney May 31, 1932.  E. H. WOLF  1,861,104
LAWN EDGE TRIMMER
Filed Oct. 12, 1931  2 Sheets-Sheet 2
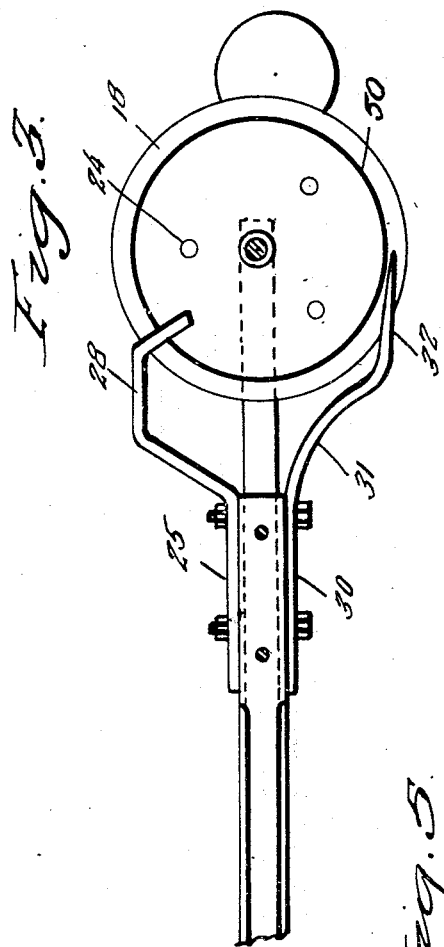
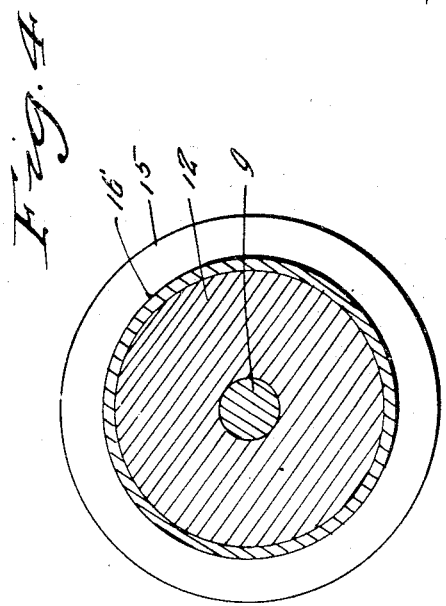
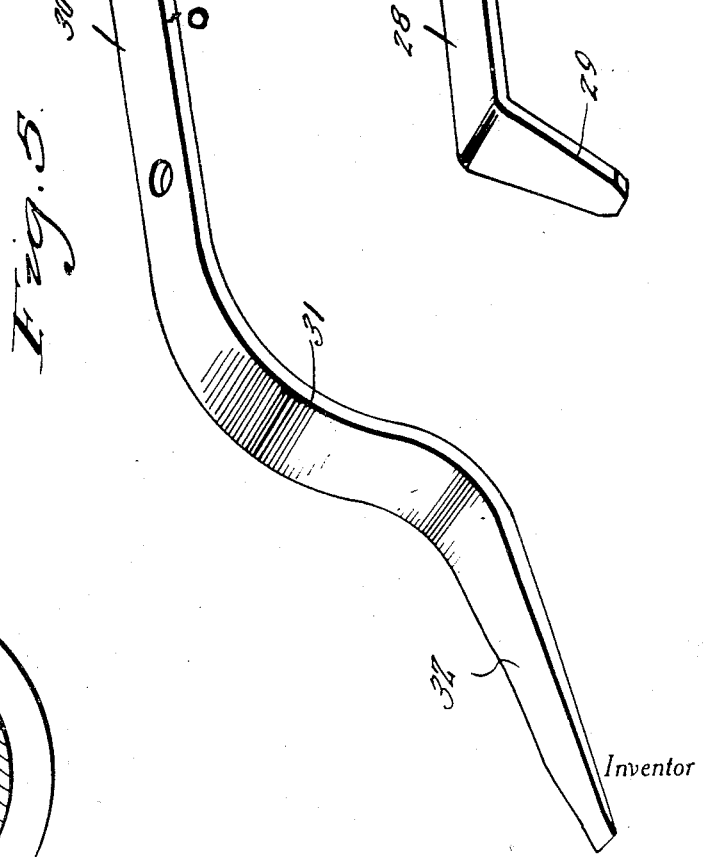
Inventor
Ernest H. Wolf
By Clarence A. O'Brien
Attorney Patented May 31, 1932

1,861,104

UNITED STATES PATENT OFFICE

ERNEST H. WOLF, OF ELGIN, ILLINOIS

LAWN EDGE TRIMMER

Application filed October 12, 1931. Serial No. 568,452.

The present invention relates to a lawn edge trimmer and has for its prime object to provide a machine of this nature which may be run along the edge of a walk or the like to trim the edge of the adjacent lawn and throw the grass up on the walk so that it may be easily gathered together.

Another very important object of the invention resides in the provision of a machine of this nature which is exceedingly simple in its construction, thoroughly efficient and reliable in use and operation, inexpensive to manufacture, easy to handle, light and durable in structure, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the machine embodying the features of my invention.

Figure 2 is a side elevation thereof.

Figure 3 is a sectional view taken substantially on the line 3—3 of Figure 1.

Figure 4 is a sectional view taken on the line 4—4 of Figure 1.

Figure 5 is a perspective view of the plow, and

Figure 6 is a perspective view of the trimmer.

Referring to the drawings in detail, it will be seen that numeral 5 denotes an elongated handle on the sides of the forward end of which are bolted as at 6 a pair of arms 7 and 8 which are directed forwardly and diverge forwardly from each other and terminate in double ply ends 8' in spaced parallelism with each other and through which are journalled a shaft 9. On this shaft are a pair of collars 10 held in place by set screws 11 to the outside of the ends 8' to prevent axial movement of the shafts.

Numeral 12 denotes a roller having a coaxial collar 14 fixed to one end thereof and fixed to the shaft 9 by a set screw 15 so that as the roller rotates shaft 9 rotates therewith.

On the side of the roller 12 remote from the collar 14 is an outwardly directed annular guide flange 15. On the roller 14 is leather tire or the like 16. This roller is adapted to roll along the edge of a walk or the like with a guide flange 15 scraping along the edge of the walk. A cutting disk 18 having a bevel 50 is mounted on the shaft 9 spaced from the roller 12 by a spacer 19. Numeral 20 denotes a collar fixed to the shaft 9 by a set screw 21 adjacent end 8' of the arm 8. An annular flange 23 is formed on the inner side of the collar 20 and is fixed by suitable fastening elements 24 to the cutting disk 18.

Numeral 25 denotes a scraper element bolted as at 26 to the top of the forward end of the handle 5 and inclining upwardly and forwardly as at 27 and merging into an angular extension 28 directed forwardly which terminates in scraper blade 29 which is inclined downwardly and forwardly between the guide flange 15 and the disk 18.

Numeral 30 denotes a plow shank bolted under the handle 5 as at 26 and having a downwardly forward curved portion 31 terminating in the blade 32 which is directed forwardly adjacent the bottom portion of the cutting disk 18 for the purpose of cutting a narrow strip of sod from adjacent the walk and directing the same and the grass cut by the disk 18 on to the walk.

A wheel or roller 34 is mounted for rotation as at 25 on the forward end of an arm 36. This arm 36 is pivoted by a bolt or the like 37 on the forward portion of the arm 8. This wheel or roller 34 holds down the grass for the cutter so as to receive a clean and even edge of the lawn.

It is thought that the construction, operation, utility and advantages of this invention will now be quite apparent to those skilled in this art without a more detailed description thereof.

The present embodiment of this invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A lawn edge trimmer of the class described including a shaft, a handle, means for rotatably mounting the shaft on the handle, a roller fixed to the shaft, a cutting disk fixed to the shaft adjacent the roller, an annular outwardly directed flange on the roller at the side adjacent the disk, a plow shank fixed to the handle and extending forwardly to terminate adjacent the bottom of the disk, and a cleaner element having a shank fixed to the handle and extending forwardly to terminate between the guide flange and the disk adjacent their upper portions.

2. A lawn edge trimmer of the class described including a shaft, a handle, means for rotatably mounting the shaft on the handle, a roller fixed to the shaft, a cutting disk fixed to the shaft adjacent the roller, an annular outwardly directed flange on the roller at the side adjacent the disk, a plow shank fixed to the handle and extending forwardly to terminate adjacent the bottom of the disk, a cleaner element having a shank fixed to the handle and extending forwardly to terminate between the guide flange and the disk adjacent their upper portions, a pivoted arm on the first mentioned means and extending forwardly, and a wheel journalled for rotation on the forward end of said arm.

In testimony whereof I affix my singature.

ERNEST H. WOLF.